United States Patent [19]

Kung et al.

[11] Patent Number: 5,484,837
[45] Date of Patent: Jan. 16, 1996

[54] BLACK MASTERBATCH

[75] Inventors: Hsiang-Peng Kung, Ta-Yuan Hsien; Yao-Tsung Chang, Hsin-Chu; Cherng-Jyh Lee, Hsin-Chu; Rong-Shiun Pan, Hsin-Chu; Chia-Hui Huang, Ping-Tung, all of Taiwan

[73] Assignee: Far Eastern Textile, Ltd., Taipei, Taiwan

[21] Appl. No.: 328,365

[22] Filed: Oct. 25, 1994

[51] Int. Cl.$^6$ ................................................. C08K 3/00
[52] U.S. Cl. ........................ 524/495; 524/496; 524/513; 525/176
[58] Field of Search .................. 524/495, 496, 524/513; 525/176

[56] References Cited

U.S. PATENT DOCUMENTS 4,929,388  5/1990  Wessling ........................ 252/500

Primary Examiner—Edward Cain
Attorney, Agent, or Firm—Morton J. Rosenberg; David I. Klein

[57] ABSTRACT

A black masterbatch for polyester polymer consisting of:
(a) 25–99.7% of polyester polymer by weight;
(b) 0.1–20% of dispersive second polyester by weight and/or 0.1–15% EVA by weight; and
(c) 0.1–40% of carbon black by weight;
whereby the black masterbatch can be easily manufactured by a simple process without polluting the environment.

16 Claims, 1 Drawing Sheet

| | | EXPERIMENT 1 | EXPERIMENT 2 | EXPERIMENT 3 | EXPERIMENT 4 | EXPERIMENT 5 | EXPERIMENT 6 | EXPERIMENT 7 | EXPERIMENT 8 |
|---|---|---|---|---|---|---|---|---|---|
| COMPONENTS | PBT | 100 | 100 | 100 | 100 | 100 | 100 | 100 | 100 |
| | CARBON BLACK | 50 | 60 | 60 | 60 | 60 | 0 | 60 | 60 |
| | COPOLYESTER | 15 | 15 | 15 | 0 | 0 | 0 | 0 | 0 |
| | EVA | 3 | 3 | 0 | 3 | 0 | 0 | 0 | 0 |
| | MODIFIED POLYETHYLENE | 0 | 0 | 0 | 0 | 0 | 0 | 6 | 12 |
| TESTING RESULTS | FILTRATION GRADE psi/kg | 2.4 | 4.5 | 6.1 | 8.9 | 12.3 | 0.8 | 11.6 | 8.4 |
| | AVERAGE DIAMETER OF CARBON BLACK PARTICLES ($\mu$m) | 0.6 | 1.4 | 2.2 | 3.0 | 3.9 | --- | 3.3 | 2.8 |
| | POY FILAMENT BREAKAGE RATE (Time/Ton) | 0.4 | 0.7 | 1.6 | 3.9 | UNABLE FOR SPINNING | 0.3 | UNABLE FOR SPINNING | 3.5 |
| | DTY FILAMENT BREAKAGE RATE (Time/Ton) | 11 | 17 | 30 | 49 | --- | 8 | --- | 55 |
| | SPINNING | VERY GOOD | GOOD | ACCEPTABLE | BAD | --- | VERY GOOD | --- | BAD |
| | DTY FIBER COLOR L* | 12.1 | 12.8 | 13.7 | 14.3 | --- | --- | --- | 14.0 |
| | DTY FIBER COLOR a* | -0.1 | 0.1 | 0.5 | 0.6 | --- | --- | --- | 0.6 |
| | DTY FIBER COLOR b* | -0.3 | 0.2 | 0.7 | 1.2 | --- | --- | --- | 1.0 |

The fiber color is determined in accordance with JIS-Z-8729-1980 L*, a*, b* measuring standards.

|  |  | EXPERIMENT 1 | EXPERIMENT 2 | EXPERIMENT 3 | EXPERIMENT 4 | EXPERIMENT 5 | EXPERIMENT 6 | EXPERIMENT 7 | EXPERIMENT 8 |
|---|---|---|---|---|---|---|---|---|---|
| COMPONENTS | PBT | 100 | 100 | 100 | 100 | 100 | 100 | 100 | 100 |
|  | CARBON BLACK | 50 | 60 | 60 | 60 | 60 | 0 | 60 | 60 |
|  | COPOLYESTER | 15 | 15 | 15 | 0 | 0 | 0 | 0 | 0 |
|  | EVA | 3 | 3 | 0 | 3 | 0 | 0 | 0 | 0 |
|  | MODIFIED POLYETHYLENE | 0 | 0 | 0 | 0 | 0 | 0 | 6 | 12 |
| TESTING RESULTS | FILTRATION GRADE psi/kg | 2.4 | 4.5 | 6.1 | 8.9 | 12.3 | 0.8 | 11.6 | 8.4 |
|  | AVERAGE DIAMETER OF CARBON BLACK PARTICLES (μm) | 0.6 | 1.4 | 2.2 | 3.0 | 3.9 | --- | 3.3 | 2.8 |
|  | POY FILAMENT BREAKAGE RATE (Time/Ton) | 0.4 | 0.7 | 1.6 | 3.9 | UNABLE FOR SPINNING | 0.3 | UNABLE FOR SPINNING | 3.5 |
|  | DTY FILAMENT BREAKAGE RATE (Time/Ton) | 11 | 17 | 30 | 49 | --- | 8 | --- | 55 |
|  | SPINNING | VERY GOOD | GOOD | ACCEPTABLE | BAD | --- | VERY GOOD | --- | BAD |
|  | DTY FIBER COLOR  L* | 12.1 | 12.8 | 13.7 | 14.3 | --- | --- | --- | 14.0 |
|  | a* | -0.1 | 0.1 | 0.5 | 0.6 | --- | --- | --- | 0.6 |
|  | b* | -0.3 | 0.2 | 0.7 | 1.2 | --- | --- | --- | 1.0 |

The fiber color is determined in accordance with JIS-Z-8729-1980 L*, a*, b* measuring standards.

BLACK MASTERBATCH

BACKGROUND OF THE INVENTION

U.S. Pat. No. 3,007,891 discloses the addition of carbon black and dispersing agent of small molecular weight in the esterification reaction. However, it is necessary to use precipitation, centrifugation, and filtration in order to remove a large amount of agglomerates of carbon black before continuing polymerization in order to obtain black masterbatch. However, this black masterbatch contains only 1–10% of carbon black by weight and often contaminates the reactor or reactor piping.

U.S. Pat. No. 4,116,924 teaches using fragile dispersing hydrocarbonic resin or rosin oil resin with a softening point between 70°–195° C. and copolymer with a melting point between 140°–200° C. to manufacture black masterbatch with high concentration. According to this patent, carbon black is first charged into a mill with cationic surfactant and water, ground into colloidal-like fluid aqueous dispersion of carbon black, and then charged with dispersive resin under the control of PH value at a predetermined range. Thereafter, the water is removed and the dried material is blended with copolyester through an extruder to form pellets. However, the manufacture and treatment of the dispersing liquid is relatively complicated.

U.S. Pat. Nos. 3,905,937 and 4,001,171 disclose utilizing compounds which are complicated in structure and difficult to obtain as the dispersing agent.

U.S. Pat. Nos. 3,905,937, 4,001,171, 4,279,902 and 4,379,871 teach the addition of organic solvent in the manufacturing process so that the organic solvent must be removed or retrieved as the process has been completed thereby making the manufacturing process difficult and complicated.

U.S. Pat. Nos. 4,879,335 and 5,106,905 disclose mixing carbon black with liquid polyester to form liquid coloring agent for polyester spinning. However, the liquid coloring agent will lower the viscosity of the spinning polyester and will not have sufficient thermal stability at the spinning temperature between 280°–300° C. so that the liquid coloring agent will be degraded into gas with smaller molecular weight. Further, the polyester will turn to be yellow in color and the filament breakage rate will be increased. In addition, there will be badly influence to the strength, stretch ability, and heat resistance of the fiber.

Japanese Publication No. 49-87792 and U.S. Pat. No. 4,208,318 suggest addition of a small amount of chemically modified metal phthalocyanine so as to make the color concentrate have a slight bluish tone. However, the chemically modified metal phthalocyanine is too expensive to use it.

Therefore, it is an object of the present invention to provide a black masterbatch which can obviate and mitigate the above-mentioned drawbacks.

SUMMARY OF THE INVENTION

This invention relates to an improved black masterbatch for polyester spinning.

It is the primary object of the present invention to provide a black masterbatch of which the carbon black is well dispersed and will not be agglomerated.

It is another object of the present invention to provide a black masterbatch of which the components are easily obtained.

It is still another object of the present invention to provide a black masterbatch which has a simple manufacturing process.

It is still another object of the present invention to provide a black masterbatch which does not need the addition of any surfactant or solvent.

It is a further object of the present invention to provide a black masterbatch which possesses good thermal stability.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 1 is a table showing the components and characteristics of the compositions according to the present invention.

DETAILED DESCRIPTION OF THE PREFERRED EMBODIMENT

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

The present invention has the following advantages:

1. the components are easily obtained;
2. the manufacturing process is simple;
3. no surfactant or solvent is required; and
4. the composition has good thermal stability.

Further, the carbon black is evenly dispersed in the composition and the present invention can decrease the filament breakage rate and improve the twisting ability and giving the black filament a slight bluish tone. In addition, the carbon black content is high up to 40% by weight in the present invention. As the carbon black is evenly dispersed in the composition, the filter will not be blocked thereby.

The black masterbatch according to the present invention mainly consists of polyester polymer with an intrinsic viscosity of 0.4–1.2.

Generally, dispersing agent and dispersing assistant agent are added in order to obtain evenly dispersing effect in the commonly used blending method for producing black masterbatch. Nevertheless, the dispersing agent and the dispersing assistant agent must have good compatibility with polyester polymer and must be able to wet the carbon black so as to decrease the agglomeration thereof.

The black masterbatch according to the present invention utilizes a second polyester, which may be a copolyester as the dispersing agent which is an oligomer or high molecular polymer with an intrinsic viscosity of 0.2–0.7, molecular weight of 200–25000, and softening point of 30°–120° C. The appropriate amount of dispersive copolyester added is 0.8–80 percentage by weight relative to main polyester. The second polyester polymer may be a one-component polymer such as polybutylene terephthalate, PET, polycyclohexane di-methylene terephthalate, or a copolyester. Where the second polyester polymer is a copolyester, such may be formed from a dialcohol such as ethylene glycol, 1,4-butanediol, 1,5-pentanediol, 1,6-hexanediol, diethylene glycol, 1,4-dimethylol cyclohexane, 3-methyl-pentanediol, or 2-methyl-hexanediol and a diacid such as malonic acid, succinic acid, glutaric acid, adipic acid, pimelic acid, suberic acid, azelaic acid, sebacic acid, 1,4-cyclohexane dicarboxylic acid, p-phthalic acid, and ixophthalic acid.

Also, the black masterbatch according to the present invention contains an appropriate amount of EVA (ethylene-vinyl acetate) as the dispersing assistant agent with a melting point of 87°–92° C. The amount of the EVA added is 0.1–60 percentage by weight relative to main polyester.

The diameter, structure and surface property of the carbon black are important factors as to spinning, color and appearance.

The black masterbatch according to the present invention comprises the following components in percentage by weight:

a. 25–99.7 polyester;
b. 0.1–20 dispersing polyester and/or 0.1–15 EVA; and
c. 0.1–40 carbon black.

EXAMPLE 1

The following composition is prepared:

| | |
|---|---|
| 100 g | PBT |
| 15 g | copolyester |
| 3 g | EVA |
| 50 g | carbon black |

The above-mentioned components are first ground into powder with 150–350 μm in diameter and then mixed with 50 g of carbon black (produced by DEGUSSA and named PRINTEX P and having an average diameter of 0.02 μm) for 10–15 minutes. Then, the mixture is fed into a ZSK-40 Werner-Pfleiderer twin screw extruder to form black masterbatch. The extruder has an output of 60 kg/hr and is kept running at 88–95% of maximum torque. Further, each heating zone is maintained at a temperature of 170°–240° C. By means of excellent formulation, it is very easy to cut the black strand into pellets. The black masterbatch obtained is cylindrical in shape and about 3mm in diameter and length.

The method to decide whether the dispersion degree of the carbon black of the black masterbatch is good or not for spinning is described as follows:

1. Mixing the black masterbatch with PET (produced by FAR EASTERN TEXTILE, named CF-270, with a IV of 0.65, a melting point of 255° C.) at a ratio of 2g to 98 g;

2. Feeding the mixture into a small single screw extruder. All heating zones of the extruder are kept at a temperature 280°–300° C. Further, the extruder has an throughput about of 3.6 kg/hr and is provided with a circular beehive type screenpack with a diameter of one inch at the front end in which are fitted a first filter of 100 mesh, a second filter of 250 mesh, a third filter of 400 mesh, a fourth filter of 250 mesh, and a fifth filter of 100 mesh.

Then, we can calculate out the filtration grade to decide whether the dispersion degree of the carbon black is good or not. The formula is as follows:

$$F=(P_f-P_i)/W \; psi/kg$$

F denotes the filtration grade, Pf the final pressure, Pi the initial pressure, and W the weight of the composition obtained by the extruder.

If the filtration grade is below 10 psi/kg, the black masterbatch will be good for PET spinning. In accordance with the present invention, the filtration grade is only 2.4 psi/kg and this means the dispersion degree of the carbon black is very good and suitable for spinning.

In addition, the dispersion degree of carbon black can be inspected by microscope as follows:

1. Mixing the black masterbatch with the above-mentioned PET so that the mixture contains 0.5 percentage of carbon by weight.

2. Using a microscope to magnify the mixture by 300 times.

Through the microscope, we can see that the carbon black is very evenly dispersed in the PET and the average diameter of the black masterbatch is smaller than 0.6 μm and the largest one does not exceed 4.5 μm in diameter.

The POY obtained by spinning a mixture of the black masterbatch with PET (CF-270) at a proportion of 1 to 23 is very desirable, with a filament breakage rate of 0.4 time/ton and a black color with bluish tone. The spinning temperature is between 280°–300° C., the spinning specification is 245d/32f and the spinning rate is fixed at 3500 m/min. The POY is further twisted at a speed of 600 m/min and a temperature between 160°–200° C. The DTY obtained has a filament breakage rate of 11 times/ton and a black color with bluish tone. The components and the characteristics of the composition are shown in FIG. 1.

EXAMPLE 2

The composition and the process are identical to those of Example 1, except that the percentage of carbon black has been increased from 50 g to 60 g. The components and the characteristics of the composition obtained by experiments are shown in FIG. 1.

EXAMPLE 3

The composition and the process are identical to those of Example 2, except that the EVA has been removed. The components and the characteristics of the composition obtained by experiments are shown in FIG. 1.

EXAMPLE 4

The composition and the process are identical to those of Example 2, except that the copolyester has been removed. The components and the characteristics of the composition obtained by experiments are shown in FIG. 1.

EXAMPLE 5

The composition and the process are identical to those of Example 2, except that the copolyester and the EVA have been removed. The components and the characteristics of the composition obtained by experiments are shown in FIG. 1.

EXAMPLE 6

The composition contains PBT only and its characteristics are shown in FIG. 1.

EXAMPLE 7

The composition and the process are identical to those of Example 3, except that the 15 g of copolyester has been replaced with 6 g of modified polyethylene (manufactured by Allied Signal and named ACtone 2010 and having a softening point of 85° C. and a molecular weight larger than 3000). The components and the characteristics of the composition obtained by experiments are shown in FIG. 1.

EXAMPLE 8

The composition and the process are identical to those of Example 7, except that the percentage of modified polyethylene has been increased from 6 g to 12 g. The components and the characteristics of the composition obtained by experiments are shown in FIG. 1.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

We claim:

1. A black masterbatch for a polyester polymer, consisting of:
    (a) 25–99.7% by weight of a first polyester polymer;
    (b) 0.1–40% by weight of carbon black;
    (c) 0.1–20% by weight of a second polyester polymer, said second polyester polymer acting as a dispersing agent for said carbon black to decrease agglomeration of said carbon black; and,
    (d) 0.1–15% by weight of EVA acting as a dispersing assisting agent for said carbon black.

2. The black masterbatch as recited in claim 1 where said carbon black has an average particulate diameter of less than 3.0 microns.

3. The black masterbatch as recited in claim 1 where said first polyester polymer is within the approximating range of 25–65% by weight, said second polyester polymer is within the approximating range of 8–15% by weight, and said EVA is within the approximating range of 5–10% by weight.

4. The black masterbatch as recited in claim 1 where said second polyester polymer is selected from the group consisting of one-component polymers and copolyesters.

5. The black masterbatch as recited in claim 4 where said second polyester polymer is a one-component polymer selected from the group consisting of polybutylene terephthalate, PET, and polycyclohexane di-methylene terephthalate.

6. The black masterbatch as recited in claim 5 where said first polyester polymer has an intrinsic viscosity between 0.4–1.2 and a melting point between 200°–330° C.

7. The black masterbatch as recited in claim 5 where said first polyester polymer has an intrinsic viscosity between 0.7–1.0.

8. The black masterbatch as recited in claim 4 where said second polyester polymer is formed from a dialcohol selected from the group consisting of ethylene glycol, 1,4-butanediol, 1,5-pentanediol, 1,6-hexanediol, diethylene glycol, 1,4-dimethylol cyclohexane, 3-methyl-pentanediol, and 2-methyl-hexanediol; and a diacid selected from the group consisting of malonic acid, succinic acid, glutaric acid, adipic acid, pimelic acid, suberic acid, azelaic acid, sebacic acid, 1,4-cyclohexane dicarboxylic acid, p-phthalic acid, and isophthalic acid.

9. The black masterbatch as recited in claim 8 where said first polyester polymer has an intrinsic viscosity between 0.4–1.2 and a melting point between 200°–330° C.

10. The black masterbatch as recited in claim 8 where said first polyester polymer has an intrinsic viscosity between 0.7–1.0.

11. The black masterbatch as recited in claim 8 where said second polyester polymer has an intrinsic viscosity between 0.2–0.7 and a softening point between 30°–120° C.

12. A black masterbatch for a polyester polymer, consisting of:
    (a) 25–99.7% by weight of a first polyester polymer;
    (b) 0.1–40% by weight of carbon black, said carbon black having an average particulate diameter of less than 3.0 microns; and,
    (c) 0.1–20% by weight of a second polyester polymer, said second polyester polymer acting as a dispersing agent for said carbon black to decrease agglomeration of said carbon black.

13. The black masterbatch as recited in claim 14 where said second polyester polymer is selected from the group consisting of one-component polymers and copolyesters.

14. The black masterbatch as recited in claim 13 where said second polyester polymer is a one-component polymer selected from the group consisting of polybutylene terephthalate, PET, and polycyclohexane di-methylene terephthalate.

15. The black masterbatch as recited in claim 13 where said second polyester polymer is formed from a dialcohol selected from the group consisting of ethylene glycol, 1,4-butanediol, 1,5-pentanediol, 1,6-hexanediol, diethylene glycol, 1,4-dimethylol cyclohexane, 3-methyl-pentanediol, and 2-methyl-hexanediol; and a diacid selected from the group consisting of malonic acid, succinic acid, glutaric acid, adipic acid, pimelic acid, suberic acid, azelaic acid, sebacic acid, 1,4-cyclohexane dicarboxylic acid, p-phthalic acid, and isophthalic acid.

16. The black masterbatch as recited in claim 12 where said second polyester polymer is PBT.

* * * * *